(12) United States Patent
Diamos et al.

(10) Patent No.: US 10,832,120 B2
(45) Date of Patent: Nov. 10, 2020

(54) SYSTEMS AND METHODS FOR A MULTI-CORE OPTIMIZED RECURRENT NEURAL NETWORK

(71) Applicant: Baidu USA LLC, Sunnyvale, CA (US)

(72) Inventors: Gregory Diamos, San Jose, CA (US); Awni Hannun, Palo Alto, CA (US); Bryan Catanzaro, Cupertino, CA (US); Dario Amodei, San Francisco, CA (US); Erich Elsen, Mountain View, CA (US); Jesse Engel, Oakland, CA (US); Shubhabrata Sengupta, Menlo Park, CA (US)

(73) Assignee: Baidu USA LLC, Sunnyvale, CA (US)

( * ) Notice: Subject to any disclaimer, the term of this patent is extended or adjusted under 35 U.S.C. 154(b) by 1227 days.

(21) Appl. No.: 15/091,413

(22) Filed: Apr. 5, 2016

(65) Prior Publication Data

US 2017/0169326 A1    Jun. 15, 2017

Related U.S. Application Data

(60) Provisional application No. 62/266,515, filed on Dec. 11, 2015.

(51) Int. Cl.
  *G06N 3/04* (2006.01)
  *G06N 3/06* (2006.01)
  (Continued)

(52) U.S. Cl.
  CPC ............. *G06N 3/04* (2013.01); *G06N 3/0445* (2013.01); *G06N 3/063* (2013.01); *G06N 3/088* (2013.01)

(58) Field of Classification Search
  CPC ........ G06N 3/04; G06N 3/0445; G06N 3/063; G06N 3/088
  See application file for complete search history.

(56) References Cited

U.S. PATENT DOCUMENTS

2007/0185825 A1    8/2007  Ito et al.
2016/0328644 A1*  11/2016  Lin ........................... G06N 3/08

FOREIGN PATENT DOCUMENTS

CN        101308551 B       6/2010
CN        103023839 B      12/2016

OTHER PUBLICATIONS

R.J. Howlett and S.D. Walters, "Multi-computer neural network architecture", IEEE, 1999. (Year: 1999).*

(Continued)

*Primary Examiner* — Benjamin P Geib
(74) *Attorney, Agent, or Firm* — North Weber & Baugh LLP

(57) ABSTRACT

Systems and methods for a multi-core optimized Recurrent Neural Network (RNN) architecture are disclosed. The various architectures affect communication and synchronization operations according to the Multi-Bulk-Synchronous-Parallel (MBSP) model for a given processor. The resulting family of network architectures, referred to as MBSP-RNNs, perform similarly to a conventional RNNs having the same number of parameters, but are substantially more efficient when mapped onto a modern general purpose processor. Due to the large gain in computational efficiency, for a fixed computational budget, MBSP-RNNs outperform RNNs at applications such as end-to-end speech recognition.

20 Claims, 13 Drawing Sheets

(51) Int. Cl.
    G06N 3/08    (2006.01)
    G06N 3/063   (2006.01)

(56) References Cited

OTHER PUBLICATIONS

Zhang et al., "Deep Residual Learning for Image Recognition," ArXiv e-prints, Dec. 2015 (12pgs).
Hinton et al., "Deep neural networks for acoustic modeling in speech recognition," IEEE Signal Processing Magazine, Nov. 29:82-97, 2012 (27pgs).
Iyyer et al., "Deep unordered composition rivals syntactic methods for text classification," In Association for Computational Linguistics, 2015.URL docs/2015_acl_dan.pdf 11pg.
Krizhevsky et al., "ImageNet classification with deep convolutional neural networks," In Advances in Neural Information Processing Systems 25, p. 1106-1114, 2012 (9pgs).
Lavin et al., "Fast algorithms for convolutional neural networks," CoRR, abs/1509.09308, 2015. URL http://arxiv.org/abs/1509.09308 (9pgs).
Le et al., "Compositional distributional semantics with long short term memory," arXiv preprint arXiv:1503.02510, 2015 (10pgs).
Mikolov et al., "Recurrent neural network based language model," In INTERSPEECH 2010, 11th Annual Conference of the International Speech Communication Association, Makuhari, Chiba, Japan, Sep. 26-30, 2010, p. 1045-1048, 2010 (4pgs).
Mohamed et al., "Acoustic modeling using deep belief networks," IEEE Transactions on Audio, Speech, and Language Processing, (99), 2011, URL http://ieeexplore.ieee.org/xpls/abs_all.jsp?arnumber=5704567 (10pgs).
Scott Gray,"Assembler for nvidia maxwell architecture," 2014. URL https://github.com/NervanaSystems/maxas (2 pgs).
Hannun et al.,"Deep speech: Scaling up end-to-end speech recognition," 1412.5567, 2014. URL http://arxiv.org/abs/1412.5567 (12 pgs).
He et al.,"Deep Residual Learning for Image Recognition," ArXiv e-prints, Dec. 2015 (12 pgs).
Srivastava et al.,"Highway networks," CoRR, abs/1505.00387, 2015. URL http://arxiv.org/abs/1505.00387 (6 pgs).
Sutskever et al.,"On the importance of momentum and initialization in deep learning," In 30th International Conference on Machine Learning, 2013 (14 pgs).
Ilya Sutskever,"Training recurrent neural networks," 2013 (101pgs).
Sutskever et al., "On the importance of momentum and initialization in deep learning," In 30th International Conference on Machine Learning, 2013 (9pgs).
Sutskever, "Training recurrent neural networks," 2013 (101pgs).
Sutskever et al., "Sequence to sequence learning with neural networks," In Proc. NIPS, Montreal, CA, 2014. URL http://arxiv.org/abs/1409.3215 (9pgs).
Szegedy et al., "Going deeper with convolutions," CoRR, abs/1409.4842, 2014. URL http://arxiv.org/abs/1409.4842 (9pgs).
Toshev et al., "DeepPose: Human pose estimation via deep neural networks," CoRR, abs/1312.4659, 2013. URL http://arxiv.org/abs/1312.4659 (8pgs).
Valiant, "A bridging model for multi-core computing," In Proceedings of the 16th Annual European Symposium on Algorithms, ESA '08, p. 13-28, Berlin, Heidelberg, 2008. Springer-Verlag. ISBN 978-3-540-87743-1. doi:10.1007/978-3-540-87744-8_2. URL http://dx.doi.org/10.1007/978-3-540-87744-8_2 (9pgs).
Vasilache et al., "Fast convolutional nets with fbfft: A GPU performance evaluation," CoRR, abs/1412.7580, 2014. URL http://arxiv.org/abs/1412.7580 (17pgs).
Amodei et al., "Deep Speech 2 : End-to-End Speech Recognition in English and Mandarin," arXiv preprint arXiv:1512.02595, 2015 (10 pgs).
Senior et al., "Application of pretrained deep neural networks to large vocabulary speech recognition," In Interspeech, 2012 (11pg).
Pascanu et al., "On the difficulty of training recurrent neural networks," abs/1211.5063, 2012. http://arxiv.org/abs/1211.5063 (12pgs).
Sainath et al., "Convolutional, long short-term memory, fully connected deep neural networks," In ICASSP, 2015 (5pgs).
Sainath et al., "Deep convolutional neural networks for LVCSR," In ICASSP, 2013 (5pgs).
Sak et al., "Sequence discriminative distributed training of long shortterm memory recurrent neural networks," In Interspeech, 2014 (5pgs).
Seide et al., "Conversational speech transcription using context-dependent deep neural networks," In Interspeech, p. 437-440, 2011 (4pgs).
Simonyan et al., "Very deep convolutional networks for large-scale image recognition," CoRR, abs/1409.1556, 2014. URL http://arxiv.org/abs/1409.1556 (14pgs).
Socher et al., "Parsing Natural Scenes and Natural Language with Recursive Neural Networks," In Proceedings of the 26th International Conference on Machine Learning (ICML), 2011 (8pgs).
Socher et al., "Recursive deep models for semantic compositionality over a sentiment treebank," In EMNLP, 2013 (12pgs).
Abdel-Hamid et al., "Applying convolutional neural networks concepts to hybrid NN-HMM model for speech recognition," In ICASSP, 2012 (4pgs).
Amodei et al., Deep speech 2: End-to-end speech recognition in english and mandarin. arXiv preprint arXiv:1512.02595, 2015 (28pgs).
Bandanau et al., "Neural machine translation by jointly learning to align and translate," CoRR, abs/1409.0473, 2014. URL http://arxiv.org/abs/1409.0473 (15pgs).
Bengio et al., "A neural probabilistic language model," Journal of Machine Learning Research, 3:1137-1155, 2003 (19pgs).
Chen et al., "A fast and accurate dependency parser using neural networks," In Proceedings of the 2014 Conference on Empirical Methods in Natural Language Processing,EMNLP2014 Oct. 25-29, 2014, Doha, Qatar, A meeting of SIGDAT, a Special Interest Group of the ACL, pp. 740-750, 2014. URL http://aclweb.org/anthology/D/D14/D14-1082.pdf (11pgs).
Chetlur et al., "cuDNN: Efficient primitives for deep learning," URL http://arxiv.org/abs/1410.0759 (9pgs).
Collobert et al., "A unified architecture for natural language processing: Deep neural networks with multitask learning," In International Conference on Machine Learning, ICML, 2008 (8pgs).
Dahl et al., "Large vocabulary continuous speech recognition with context-dependent DBN-HMMs," In Proc. ICASSP, 2011a (4pgs).
European Search Report dated Apr. Apr. 18, 2017, in International Patent Application No. EP 16202973.0, dated Apr. 24, 2017 (9 pgs).
Leslie Valiant "A bridging model for multi-core computing", Journal of Computer and System Sciences, Academic Press, Inc., London, Jan. 1, 2011 (13 Pgs).
Huqqani et al., "Multicore and GPU Parallelization of Neural Networks for Face Recognition", International Conference on Computational Science, ICCS 2013 (10 Pgs).
Dahl et al., "Context-dependent pre-trained deep neural networks for large vocabulary speech recognition," IEEE Transactions on Audio, Speech, and Language Processing, 2011b (13pgs).
Devlin et al., "Fast and robust neural network joint models for statistical machine translation," In Proceedings of the 52nd Annual Meeting of the Association for Computational Linguistics, vol. 1, p. 1370-1380, 2014 (11pgs).
Dongarra et al., "Accelerating numerical dense linear algebra calculations with GPUs," Numerical Computations with GPUs, pp. 1-26, 2014 (25pgs).
Gao et al., "Are you talking to a machine? Dataset and methods for multilingual image question answering," CoRR, abs/1505.05612, 2015.URLhttp://arxiv.org/abs/1505,05612 10pgs.
Graves et al., "Speech recognition with deep recurrent neural networks," In ICASSP, 2013 (5pgs).
Gray, Assembler for NVIDIA Maxwell architecture, 2014, URL https://github.com/NervanaSystems/maxas (2pgs).
Sak et al., "Long short-term memory recurrent neural network architectures for large scale acoustic modeling," In Interspeech, 2014 (5pgs).
Hannun et al., "Deep speech: Scaling up end-to-end speech recognition," 1412.5567, 2014. http://arxiv.org/abs/1412.5567 (12pgs).

(56) References Cited

OTHER PUBLICATIONS

Search Report and Written Opinion dated Nov. 1, 2018, in Chinese Patent Application No. CN201611132073.1A (48 pgs).
Office Action dated May 29, 2019, in Chinese Patent Application No. CN 2016111,32073.1A. (4 pgs).
Office Action dated Sep. 24, 2019, in Chinese Patent Application No. CN 2016111,32073.1A. (3 pgs).
Communication pursuant to Article 94(3) EPC dated Jun. 7, 2018, in EP Patent Application No. 16 202 973.0. (7pgs).
Office Action dated Sep. 5, 2017, in Japanese Patent Application No. JP2016239363A, and the machine translation. (6pgs).

* cited by examiner

380

400

SYSTEMS AND METHODS FOR A MULTI-CORE OPTIMIZED RECURRENT NEURAL NETWORK

CROSS REFERENCE TO RELATED PATENT APPLICATIONS

This application priority benefit, under 35 U.S.C. § 119 (e), to and commonly-assigned U.S. Patent Application No. 62/266,515, filed on Dec. 11, 2015, entitled "Systems and Methods for a Multi-Core Optimized Recurrent Neural Network," listing inventors Gregory Diamos, Awni Hannun, Bryan Catanzaro, Dario Amodei, Erich Elsen, Jesse Engel, and Shubhabrata Senguptaand, which application is herein incorporated by reference in its entirety.

BACKGROUND

A. Technical Field

The present invention relates to computer processing and, more particularly, to systems, devices, and methods to increase computational efficiency by reducing synchronization and communication costs.

B. Background of the Invention

A Recurrent Neural Network (RNN) is one type of artificial neural network where the outputs of a collection of units in a given timestep are fed into the inputs of the same units in the next timestep, thereby, giving the network a notion of memory that persists over time. The computational structure of RNNs lends itself to creating networks that can solve complex sequence-to-sequence mapping problems, such as those requiring the transformation of time series data. For example, a transformation that maps a recorded audio waveform from the analog domain into a textual representation of that audio data in a speech recognition application.

However, despite the increasing throughput of arithmetic operations driven by advances in CMOS technology and RNN architectures' ability to utilize parallelism by simultaneously performing parts of a larger task in small independent pieces, conventional RNNs still suffer from significant drawbacks, such as increased synchronization cost and communication cost.

In detail, due to fundamental physical limitations of computers, the all-to-all connectivity of RNN neurons requires relatively large amounts of communication bandwidth. Additionally, each time when a connection is established between computational units (neurons) in successive timesteps in a time series, an expensive synchronization operation must be performed. Each unit within the RNN reads all inputs and writes to all outputs, such that when units are mapped into processing units in a computer, data has to cross computers in a finite amount of time. This type of communication between units, however, slows down the execution of connections in successive timesteps and increases the time intervals in which data can be transferred, thus, causing latency in the communication regardless of how much data is actually moved between units. Therefore, it would be desirable to loosen existing latency requirements by increasing the permissible time period that elapses between the communication from the output of one neuron to the input of another neuron, such that multiple timesteps can occur between data communication steps.

In addition, independent of time constraint issues imposed by synchronization operations, another limitation of existing RNN architectures is rooted in the fact that the individual units must communicate with each other across computers in the first place. Such communication is limited by the maximum total amount of data that computers can communicate between neighboring neurons in a given time period.

Common design approaches primarily focus on improving the algorithmic properties of RNNs, e.g., the ability to store data over long timescales, or on processing signals at multiple timescales. These approaches typically are not concerned with achieving gains in RNNs' computational efficiency by reducing synchronization and communication costs.

Therefore, it would be desirable to have methods and structures that take advantage of the accurate series-to-series transformations provided by simple fully-connected RNNs while, at the same time, reducing the amount of synchronization and communication performed by RNNs in order to increase computational efficiency when mapping onto a modern general purpose processor and, ultimately, improve performance.

BRIEF DESCRIPTION OF THE DRAWINGS

Reference will be made to embodiments of the invention, examples of which may be illustrated in the accompanying figures. These figures are intended to be illustrative and not limiting. Although the invention is generally described in the context of these embodiments, it shall understood that this is not intended to limit the scope of the invention to these particular embodiments. Elements in the figures may not be drawn to scale.

FIGURE ("FIG.") 1 depicts a simplified block diagram of a computing system comprising an RNN to increase computational efficiency according to various embodiments of the present disclosure.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention. In this document, the terms "architecture" and "network architecture" refer to specific patterns of connectivity between neurons in an RNN layer. "Global communication" refers to the ability of a neutron to talk to all other neurons in a network, while minimizing latency and bandwidth requirements.

Figure 1:
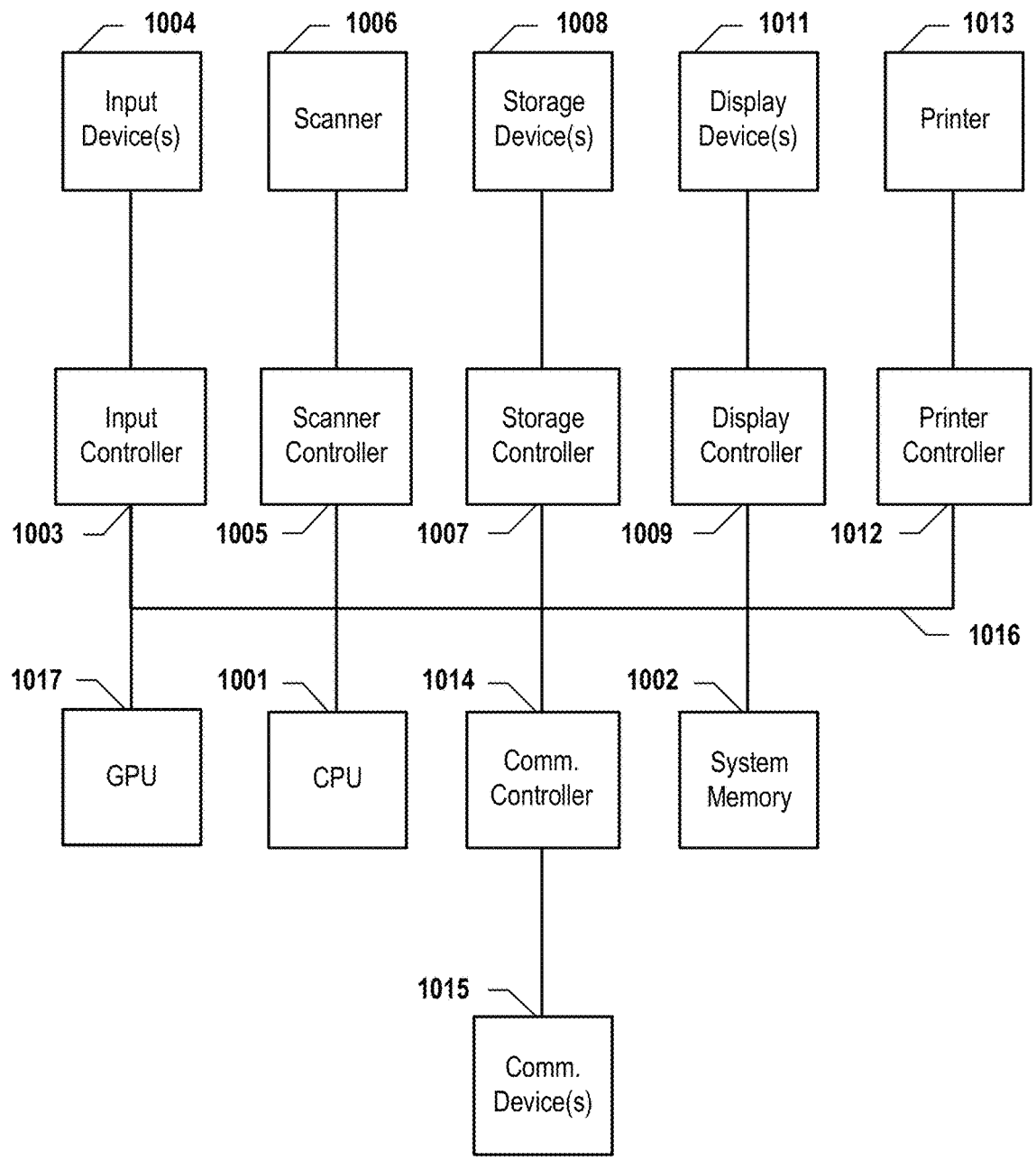

FIG. 1 depicts a simplified block diagram of a computing system comprising an RNN to increase computational efficiency according to various embodiments of the present invention. It will be understood that the functionalities shown for system 1000 may operate to support various embodiments of an information handling system—although it shall be understood that an information handling system may be differently configured and include different components. As illustrated in FIG. 1, system 1000 includes a central processing unit (CPU) 1001 that provides computing resources and controls the computer. CPU 1001 may be implemented with a microprocessor or the like, and may also include a graphics processor (GPU) 1017 and/or a floating point coprocessor for mathematical computations. System 1000 may also include a system memory 1002, which may be in the form of random-access memory (RAM) and read-only memory (ROM).

A number of controllers and peripheral devices may also be provided, as shown in FIG. 1. An input controller 1003 represents an interface to various input device(s) 1004, such as a keyboard, mouse, or stylus. There may also be a scanner controller 1005, which communicates with a scanner 1006. System 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. System 1000 may also include a display controller 1009 for providing an interface to a display device 1011, which may be a cathode ray tube (CRT) display, a thin film transistor (TFT) display, or other type of display. The computing system 1000 may also include a printer controller 1012 for communicating with a printer 1013. A communications controller 1014 may interface with one or more communication devices 1015, which enables system 1000 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

A neuron in an artificial neural network is a computational unit that processes an N-dimensional input column vector, x, and outputs a function $f(W^T x)$, where W is an N-dimensional row vector, and $f$ (a real-ranged and domained function) is called the activation function. Common activation functions include sigmoid, rectified linear, and tan h functions. Neural networks comprise multiple "neurons" such that the input of a given "neuron" may be an input to the network, or the output of another neuron. The specific pattern of connectivity between neurons is termed the "architecture" of the network.

A common network architecture is a stack of fully-connected layers. Fully-connected layers receive N input values, each of which is directly connected to each of M neurons in the layer, and produce M output values, one for each neuron.

When implemented in software and executed on processors, these neural network architectures are commonly represented using one two-dimensional matrix of floating point numbers for each layer termed weight matrix (or W), where one dimension represents the neurons in a layer and the other dimension represents the inputs to that layer. The inputs and outputs of the network are then represented using dense single-dimensional vectors. This allows the network to be evaluated as a series of matrix-vector products, one for each layer, followed by an application of the activation function for each layer. This approach enables a simple as well as efficient implementation, because highly-tuned dense linear algebra libraries that provide matrix-vector and matrix-matrix product operations are readily available for most general purpose processors.

The primary cost of this operation when mapped to modern general purpose processors is loading the weight matrix W for each layer, due to the fact that modern general purpose processors have higher operation bandwidths than memory bandwidths. This cost may be amortized over multiple network inputs, commonly termed "batching." Batching effectively packs multiple input vectors into a larger matrix, allowing the evaluation of the network to be performed using matrix-matrix products rather than matrix-vector products. For sufficiently large batch sizes, this operation may be limited by the floating-point operation bandwidth of a processor, rather than its memory bandwidth.

Recurrent neural networks with fully-connected layers start with normal fully-connected layers and augment them with additional connections from the output of each neuron on a current timestep to all other neurons on the next timestep.

Let a single input sequence x and corresponding output sequence y be sampled from a training set $\chi=\{(x^{(1)}; y^{(1)}); (x^{(2)}; y^{(2)}), \ldots \}$. Each input sequence, $x^{(i)}$, is a time-series of length $T^{(i)}$ where every time-slice is a vector of application-specific features (e.g., audio samples), $x_t^{(i)}$, $t=0, \ldots, T^{(i)-1}$.

The forward-in-time $h^l$ recurrent layer activations are computed as:

$$h_t^l = f(h_t^{l-1}, h_{t-1}^l) \qquad (1)$$

The function f can be the standard recurrent operation:

$$h_t^l = \sigma(W^l h_t^{l-1} + U^l h_{t-1}^l + b^l) \qquad (2)$$

where $W^l$ is the input-hidden weight matrix, $U^l$ is the recurrent weight matrix, and $b^l$ is a bias term.

Implementations of RNNs typically separate the computation into two stages for each timestep. In the first stage $(W^l h_t^{l-1})$, the contribution to the output of each neuron for each timestep is computed using the neuron inputs for that timestep. Like a feed-forward network, the first stage represents the input weights of all of the neurons in the layer as a dense two-dimensional matrix and represents the inputs to the layer for each timestep as a one-dimensional dense vector. A common optimization is to unroll the time dimension and pack multiple one-dimensional input vectors together into a single two-dimensional matrix. This is made possible because the weight matrix is shared over all timesteps.

In the second stage $(U^l h_{t-1}^l)$, the connections between the outputs of the layer neurons on a given timestep and the inputs of the layer neurons on the next timestep are represented by a two-dimensional matrix, referred to as the recurrent weight matrix. In this case, each timestep is processed sequentially, because the outputs of the next timestep depend on the outputs of the current timestep, thus, requiring this operation to be performed using a matrix-vector product, followed by an application of the activation function.

Figure 2A:
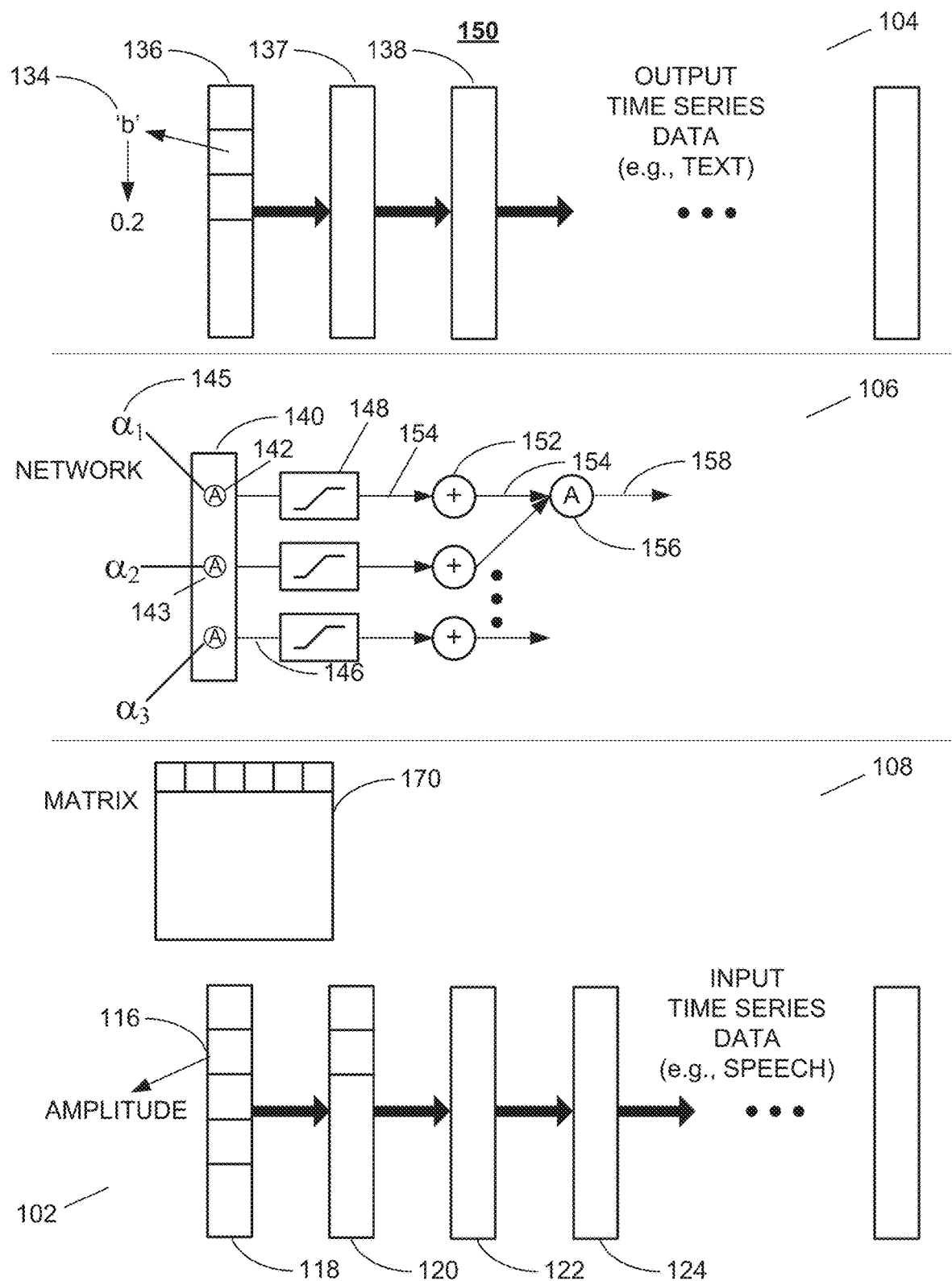
FIG. 2A shows a common, fully-connected baseline RNN layer architecture.

FIG. 2A shows a common fully-connected baseline RNN layer architecture. Blocks labeled 118-124 represent vectors comprising sets of input data, such as measured electrical signals taken at a particular time, e.g., amplitude data of an audio waveform signal sampled at a time t=0 seconds. Each vector 118-124 comprises individual values 116 and is arranged on a time scale in input time series 102 that associates each vector 118-124 with a sampling time. It is noted that the time intervals between samples need not be equidistant and that the values in a vector may equally be transformed values.

Similarly to input vectors 118-124, data in output vectors 136-138 are arranged in an output time series 104. Output vectors 136-138 comprise sets of output data of multiple samples. Each individual value 134 in output vector 136 corresponds to a character that is associated with at least one input value from input data vectors 118-124. Each character 134 represents a predicted value that corresponds to values 116 derived from the measured audio signals. As an example, value 134 in vector 136 may represent, for example, the character "b." Each character may be assigned a value, e.g. 0.2, that is interpreted as a probability. Here, RNN 150 will predict that one of the characters that is output at the timestep associated with output vector 136, with a probability of 20%, is the character "b."

Computations at intermediate layer 106 may be thought of as being performed by functional structures of linear and non-linear network components that enable a transformation. Linear transformations may be represented by matrices 108 that, in turn, are representations of equivalent graphs in layer 106. For example, matrix 108 in FIG. 2A stores parameters of the network in rows and columns wherein the rows of matrix 108 represent individual neurons and the columns represent the connections entering and exiting individual neurons. Respective functions of layers 106 and 108 are repeated for each timestep, thereby, defining the overall RNN 100.

Intermediate layer 106 in FIG. 2A comprises module 140 that comprises input values 145, non-linear transformation module 148, and linear transformation module 152 (e.g., a summing module). Module 140 comprises a sub-group of individual neurons 142 that are connected to inputs values 145 and produce output values 146 that may undergo a linear and/or non-linear transformation.

In operation, all neurons in RNN 150 communicate with each other. One or more input values 145 connecting to neuron 142 produce output value 146 and may connect into neuron 142 itself at some point 156, since neuron 142 may be represented as having a loop pointing back to itself, the loop comprising elements 142-156. In embodiments, after summation by summation element 152, neuron 142 is then connected to all other neurons in RNN 150. The output is further summed with the output of vector 120 of the subsequent timestep corresponding to vector 120 in input series 102. In a synchronization operation, in a subsequent timestep, the output of neuron 143 is used by neuron 142.

It should be clear that the second stage is the most computationally expensive. Even though the recurrent weight matrix may be reused for each timestep, the sequential dependence between timesteps involves explicit synchronization between timesteps and involves the recurrent weight matrix being reloaded from memory on each timestep if the matrix is too large to fit into on-chip memory.

A Multi-Bulk-Synchronous-Parallel (MBSP) abstract machine model is a high level performance model for describing the characteristics of a processor taking into account the physical realities of multiple processor cores that have finite memory capacity and computational resources, as well as communication and synchronization costs that increase with the number of processor cores. These costs derive from the physical characteristics of processor cores and the physical distances between processor cores.

The MBSP model is a hierarchical model, that accommodates an arbitrary number of levels. At each level, the model describes a collection of processor cores in terms of on-chip memory and cache capacities. In particular, the physical limitation of the amount of memory that can be accessed from a physical processor core in a fixed amount of time, as well as the fundamental tradeoff between physical area devoted to memory per core versus a higher number of cores creates the need for a hierarchy of memories. Each level of the hierarchy in the MBSP model may be described by four parameters: 1) the number of subcomponents/cores; 2) communication bandwidth; 3) synchronization cost; and 4) cache/memory size.

Optimal MBSP algorithms for a given problem are simultaneously optimal in terms of i) parallel computational operations, ii) parallel communication costs, and iii) synchronization costs to constant multiplicative factors. It is possible to apply the MBSP model directly to the first stage of a RNN, because it is computationally equivalent to dense matrix multiplication, and an MBSP optimal algorithm can be directly applied for dense matrix multiplication. However, the second stage is more difficult. The straightforward algorithm using a series of matrix-vector multiplications is optimal in terms of parallel computational operations. However, if the recurrent weight matrix does not fit in memory at a given level of the MBSP hierarchy, it must be accessed from the next level of the hierarchy using communication operations that will dominate the computational cost. Similarly, the sequential dependence between timesteps combined with the all-to-all connectivity between neurons forces a global synchronization operation among all processors between each timestep. For modern processors that have communication costs that are approximately 80 times higher than computation costs, and global synchronization costs approximately 6 million times higher than computation costs, it is expected that either communication or synchronization costs dominate, and that the processor's available computational resources be vastly underutilized. Frequent communication and all-to-all synchronization steps drastically reduce efficiency, because the throughputs of communication and synchronization operations are substantially lower than the throughput of arithmetic operations in modern processors, such as the CPU or GPU shown in FIG. 1.

As layer sizes continue to increase with larger data sets, large networks are unable to amortize the cost of loading weights, because the sequential dependence between timesteps requires a layer to evaluate an entire timestep before moving on to the next one. In addition, on-chip memories, especially the fastest and most efficient ones such as L1 caches and registers, are typically not large enough to store entire layers.

Computing an update for several samples simultaneously, termed mini-batch (as opposed to batch methods that use the entire dataset, and purely stochastic methods that use a single sample), mitigates some of the communication issues by combining multiple input vectors into a larger matrix to evaluate RNN 150 using matrix-matrix products rather than a matrix-vector multiplication, and by reusing the same number of weights over multiple input data elements that correspond to different timesteps. One major downside of this method, however, is that all of the different samples that are processed and their intermediate stages of computation must be stored by a factor equal to the batch size, thereby, substantially increasing the memory requirements of evaluating RNN 100, because relatively large batch sizes (e.g., 128-256) are required for high efficiency on modern processors. Another major drawback is that the approach is useful only for training the RNN 100, but not for using it after training is completed. In addition, mini-batch methods may not improve model training time, because they increase only the amount of work done per update, but not the update rate itself.

Overall, the all-to-all connectivity required by RNNs increases the bandwidth and latency required to evaluate them. Therefore, it would be desirable to have methods and structures that allow for series-to-series transformations provided by RNN architectures without being restricted by the synchronization latency and bandwidth limitations inherent in conventional RNN designs.

Figure 2B:
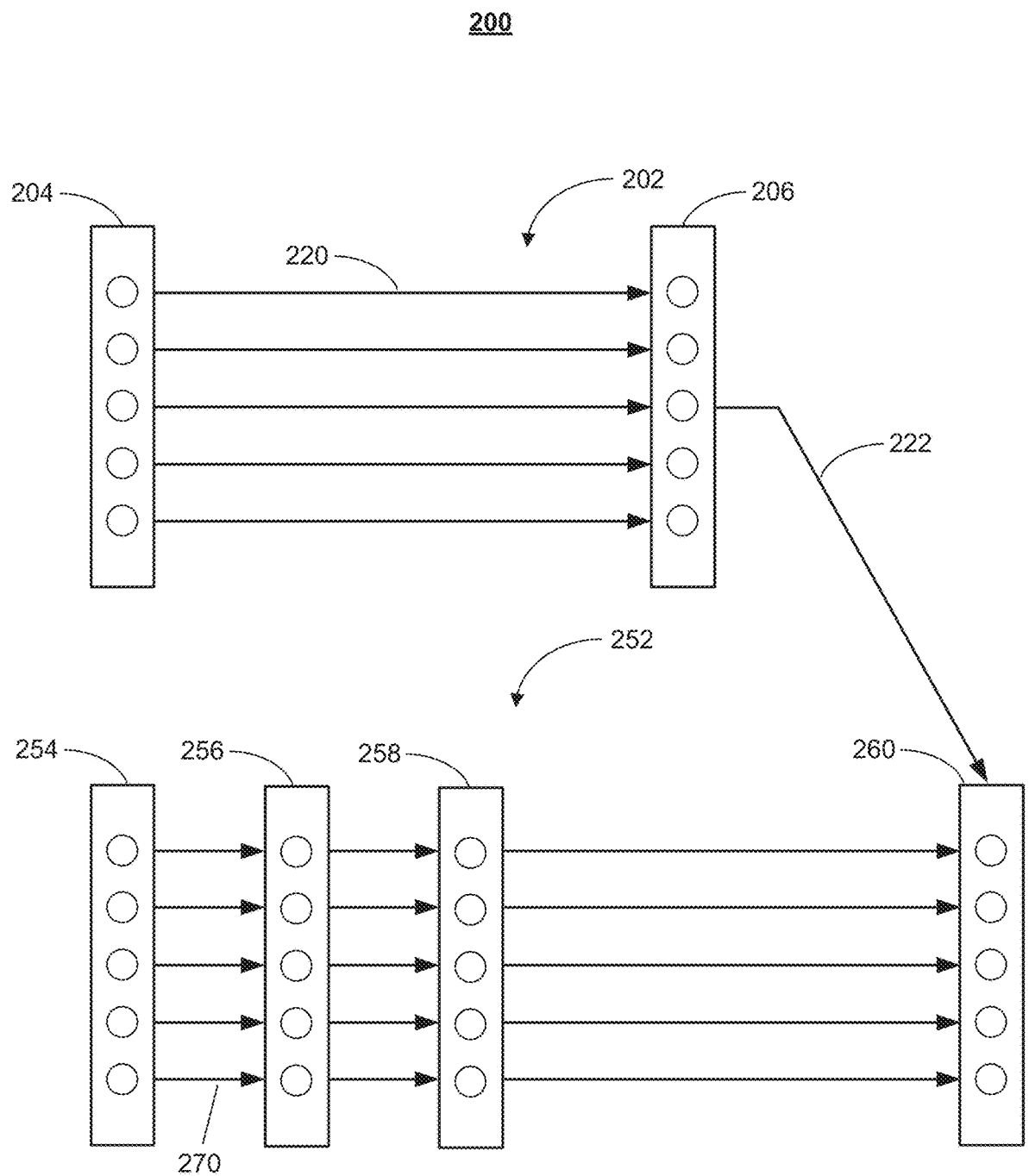
FIG. 2B shows connectivity between modules in a common RNN layer architecture using fast and slow modules in a time series.

FIG. 2B shows connectivity between modules in a common RNN layer architecture using fast and slow modules in a time series. As with the baseline network 150 in FIG. 2A, network 200 in FIG. 2B uses the concept of modules that comprise individual neurons. Network 200 contains a single layer 252 of fast modules 254-260 and two or more layers 202 of relatively slower modules 204-206. In operation, fast modules 254-260 in network 200 communicate with each other and slow modules 204-206 communicate with each other via appropriate connections 220 and 270, respectively. The communication between fast modules 254-260 in fast layer 252 and slow modules 204-206 in slow layer(s) 202 is infrequent. In addition, such communication is limited to one-directional communication 222 from slow layer(s) 202 to fast layer 252. In other words, fast modules 254-260 in fast layer 252 do not feed into slow modules 204-206 in slow layer(s) 202.

It is noted that the design is mainly intended to allow network 200 to process signals at multiple resolutions. This purpose is based on the assumption that the type of communication model underlying the structure of network 200 better approximates a specific class of functions, e.g., for a fully-connected model such as the baseline model shown in FIG. 2A. In audio applications, for example, where frequency components in the input audio data typically vary at different speeds and result in both rapidly and slowly changing components at the same time, the mapping function of network 200 is more likely to naturally simulate the underlying sampling process that is to be modeled by that function.

Figure 2C:
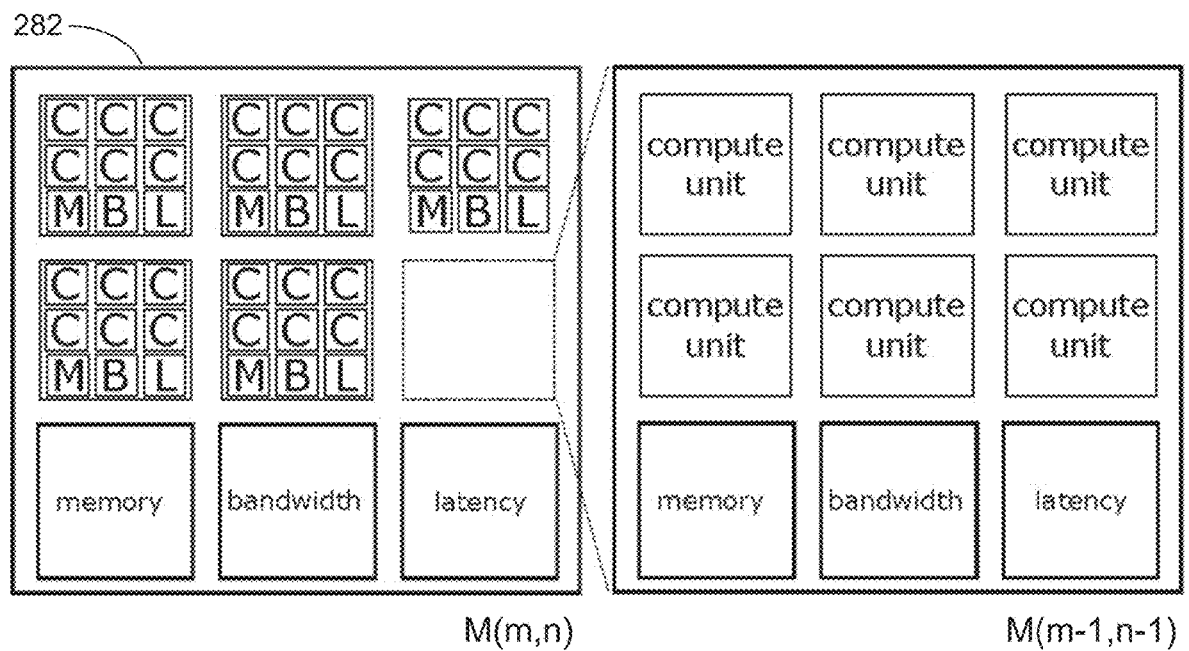
FIG. 2C is a depiction of a single level of hierarchy of the Multi-Bulk-Synchronous-Parallel (MBSP) machine model.
Figure 2D:
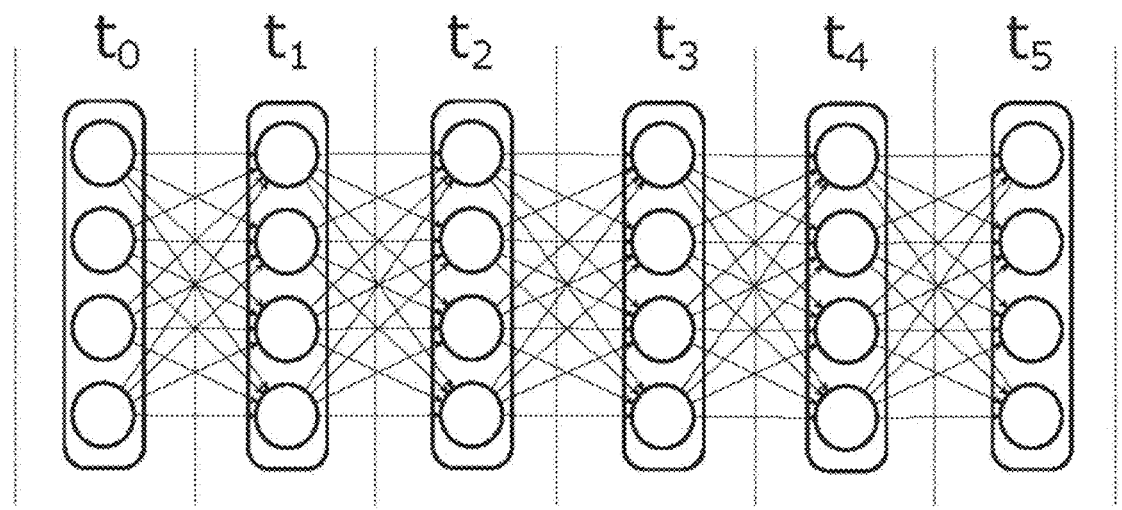
FIG. 2D is an example of a lowest level hierarchy MBSP module.

FIG. 2C is a depiction of a module in a single level of hierarchy of the Multi-Bulk-Synchronous-Parallel (MBSP) machine model. FIG. 2D shows an example of a lowest level hierarchy MBSP module that is unrolled across six timesteps. Each module contains four neurons.

In FIG. 2C, the level of the hierarchy in module 282, contains memory with associated latency and bandwidth, as well as six sublevels. The last sublevel is show in expanded view on the right-hand side of FIG. 2C. Each module 282 is denoted with M(m, n), where m is the level of the hierarchy (from lowest to highest), and n is the index of the module within a given level of hierarchy. Modules 282 comprise a fully-connected set of artificial neural network units. Units may be simple linear threshold units, or more complex units, such as Long-Short-Term-Memory (LSTM) units or Gated-Recurrent-Units (GRUs).

Figure 3A:
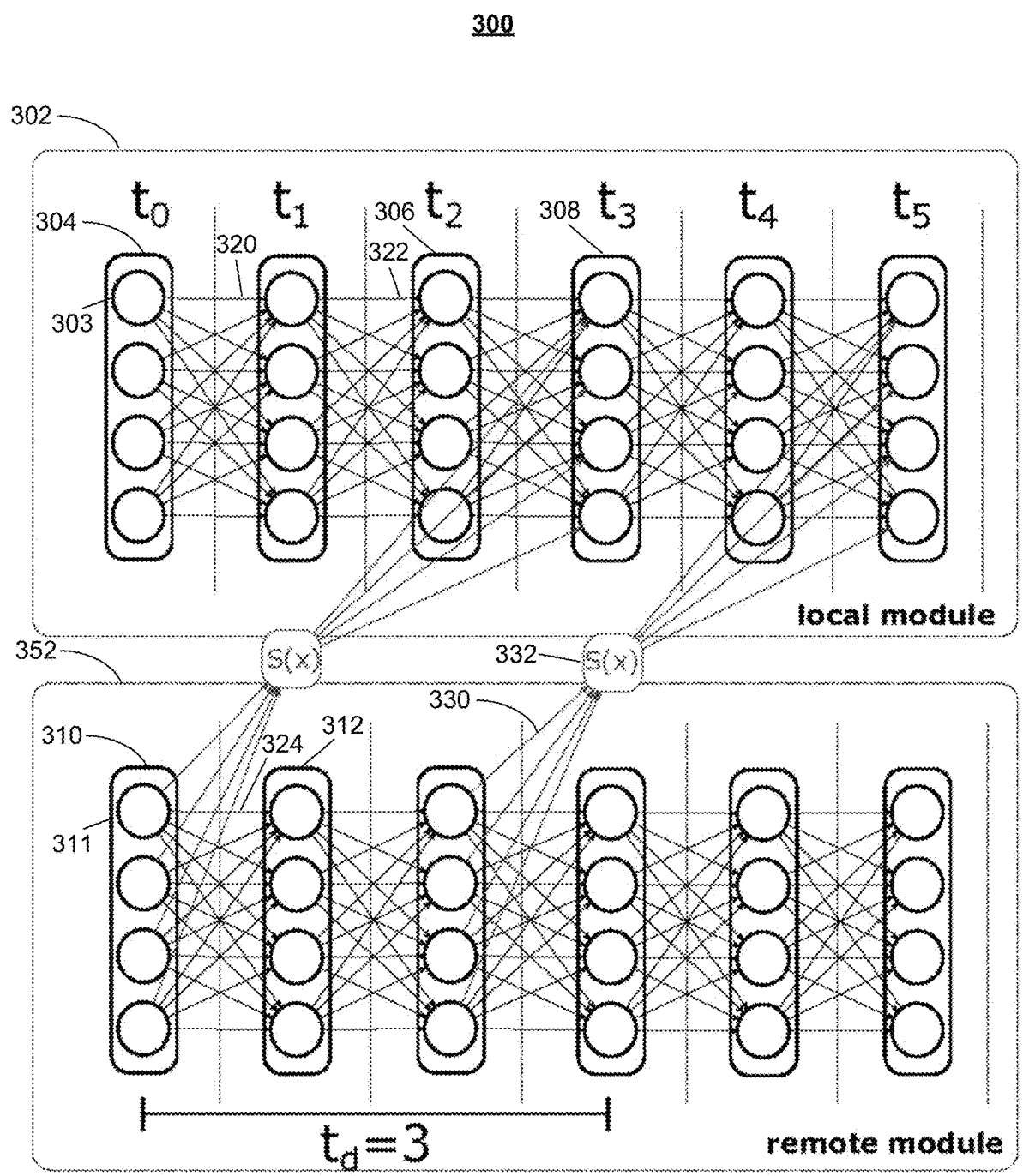
FIG. 3A illustrates interconnectivity between two MBSP modules in the second level of a hierarchy of an RNN, according to various embodiments of the present disclosure.

A MBSP-RNN according to embodiments of the present disclosure may comprise a hierarchy of modules. At the lowest level of the hierarchy, an MBSP-RNN module may be a simple RNN layer. At all other levels of the hierarchy, a module is defined recursively as an instance of an MBSP-RNN layer. FIG. 3A illustrates interconnectivity between two MBSP modules in the second level of a hierarchy of an RNN, according to various embodiments of the present disclosure. Network 300 comprises individual neurons 303 that are strategically grouped and connected together in sub-groups or logical modules, e.g., 304 into which data may be divided. In embodiments, network 300 comprises one or more layers 352 of fast or remote modules, e.g., 310-312 and one or more layers 302 of relatively slower or local modules, e.g., 304-308. In embodiments, each module in layer 302 is connected to all other modules in layer 302. Similarly, in embodiments, each module in layer 352 is connected to all other modules in layer 352. In addition, any number of modules may be connected to communicate with each other via connections 330 that denote inter-module connections.

In operation, within a given level of hierarchy, modules may be connected sparsely, update at a lower frequency, and update with a time-delay. In embodiments, sparse connections 332 are designed such that the outputs of a given module are connected only to a subset of the inputs of other modules. For example, if a given level of hierarchy contains four modules, each module may be connected to its two nearest neighbors, but not to all other modules. Sparse connections reduce the communication bandwidth required by a module. They also reduce the on-chip memory requirement of the module by decreasing the number of weights that need to be stored by the module.

In embodiments, network 300 has a time-delay (td) of three, meaning that inter-module connections 330 skip ahead by three timesteps. Time-delayed connections send data each timestep, but the data need not reach the destination for several additional timesteps. In other words, the outputs are delayed by D timesteps before reaching the inputs of the next module. This time delay gives neurons more time to perform synchronizations and reduces the total number of synchronizations along time-delayed connections.

In embodiments, the activations for the first level of an MBSP-RNN may be expressed with M levels of hierarchy and N modules per level as:

$$h_{t,0,n}{}^l = W^l h_{t,n}{}^{l-1} + b_n{}^l + U_{0,n,n}{}^l h_{t-1,M-1,n}{}^l \qquad (3)$$

where $W^l h_{t,n}{}^{l-1} + b_n{}^l$ is the normal feed-forward contribution from the previous layer, and $U_{0,n,n}{}^l h_{t-1,M-1,n}{}^l$ is the contribution of a single module, using only its own outputs from the previous timestep as inputs.

The contribution to the activations of each successive level in the hierarchy may be expressed as:

$$h_{t,m,n}{}^l = h_{t,m-1,n}{}^l + \Sigma_{j=0}^N U_{m,n,j}{}^l su_{m,n,j}(t, h_{t-d,m-1,j}{}^l) \qquad (4)$$

Where the $h_{t,m-1,n}{}^l$ is the contribution from Equation 3, and the remaining terms are the sum of contributions from other modules at this level of hierarchy. $U_{m,n,j}{}^l$ represents the connectivity between a pair of modules, $su_{m,n,j}(t, x)$ is a selection function for slow updating connections:

$$su(t, x) = \begin{cases} x: & t \bmod \text{delay} = 0 \\ 0: & t \bmod \text{delay} \neq 0 \end{cases}$$

Note that some entries of $U_{m,n,j}{}^l$ may be forced to zero to implement sparse connectivity between modules n and j.

We can form the complete activations for each module at the highest level of hierarchy as:

$$h_{t,n}{}^l = \sigma(h_{t,M-1,n}{}^l) \qquad (5)$$

Finally, the complete activations for the entire layer as the concatenation of each module at the highest level of hierarchy can be expressed as:

$$h_t^l = \begin{cases} h_{t,0}^l \\ h_{t,1}^l \\ \ldots \\ h_{t,n-2}^l \\ h_{t,n-1}^l \end{cases}$$

RNN 300 in FIG. 3A has a slow-updating factor of two, such that intermodule connections 370 are applied only every other timestep. Function S(x) 372 denotes sparse intermodule connectivity, for example, the output of neuron 311 in remote module 352 connects only to a subset of neurons in local module 302. Slow updating connections are sampled at a lower frequency than normal connections. Slow updates may be viewed as a compromise between sparse connectivity, which omits connections entirely, and regular connections that update after each timestep.

In embodiments, an output sequence that was transformed from an input sequence is used as the input sequence for the next layer (not shown). In this manner, any arbitrary number of layers may be stacked to generate a stack of stages or levels of the hierarchy that enable RNN 300 to model more complex functions. Neurons 303 within sub-group 304, e.g., at the very bottom of the hierarchy, may perform the same functions as neurons in a regular layer.

It shall be understood that the number and size of elements of RNN 300 shown in FIG. 3A, e.g., the number of neurons, connections, and timesteps between connections, is merely a parameter and is not intended as a limitation. Any number of elements may be added to and deleted from RNN 300, for example, to vary the size of the network prior and during operation. In addition, different combinations of non-linear functions may be used in different types of applications.

In embodiments, two or more modules may form larger units that are associated with a higher level of hierarchy than that of individual modules 304, while maintaining the characteristic that the time that elapses between communications increases and the amount of data that is communicated is reduced. In effect, RNN 300 seeks to simulate the structure of individual computing resources that compose a processor.

In embodiments, RNN 300 is designed for execution on a target processor or a family of processors. For the target processor, in embodiments, RNN 300 is provided with a list of sets of parameters (submodules or processor cores, communication bandwidths, synchronization costs, and cache/memory capacities), where each set of parameters represents a level of the processor's memory hierarchy similar to FIG. 2C. It is noted, however, that any number of levels or sub-levels may be chosen. Based on this description of the processor, in embodiments, starting with the lowest level of hierarchy and working up to the highest level, the set of individual neurons is separated into logical modules, and the connections between modules are pruned in a manner such that one or more of the following constraints are met:

- the parameters representing the neurons selected for a given module completely fit into the cache/memory capacity for that level of the memory hierarchy, e.g., such that cache memory capacity determines the size of the module.
- the communication cost required to perform intra-module connections and inter-module connections is approximately equal to the computational cost of evaluating the module's neurons. Bandwidth determines the number of connections with the goal being a reduction in the number of connections between modules. Individual neurons may be treated as lowest layer of modules.
- the synchronization cost required to perform inter-module connections is approximately equal to the computational cost of evaluating the module's neurons.

Latency can be defined as the amount of delay between when data is sent on a connection between modules and when it is received. Increasing the time delay at which connections between modules communicate data has the effect of reducing the number of required synchronization operations. Local communication occurs at every timestep, but global communication may occur at a delay. These changes balance the computational, communication, synchronization, and memory capacity requirements of the RNN, such that no one resource presents a significant bottleneck, thereby, improving bandwidth and achieving a less strict latency requirement.

In embodiments, constraints are balanced by reusing MBSP-RNN weight parameters over multiple timesteps so as to avoid repeated loading of weights from off-chip memory (e.g., DRAM) and reduce synchronization and off-chip memory access that comes at a significantly higher cost when compared to floating-point operations. It is noted that a practical implementation may combine two or more strategies to achieve the required amount of weight reuse to make the evaluation of the RNN balanced between computation and communication operations.

In embodiments, at every timestep, all connections of fast modules, e.g., 310-312 in RNN 300 communicate with each other, and all connections of slow modules, e.g., 304-308 communicate with each other via their respective connections. In embodiments, inter-module communication 330 between fast modules, e.g., 310-312 in fast layer 352 and slow modules, e.g., 304-308 in slow layer(s) 302 is comparatively less frequent, thus, resulting in a reduced data exchange.

It is noted that inter-module communication 330 is not limited to one-directional communication, as bi-directional communication between each layer 302, 352 is possible. In embodiments, at the lowest level of the hierarchy, modules, e.g., 304-312, form a simple RNN layer, wherein each module 304-312 comprises a fully-connected set of artificial neural network units. Units may be simple linear threshold units, or more complex units such as LSTM units or GRUs. In embodiments, at all other levels of the hierarchy, a module may be defined recursively as an instance of the simple RNN layer. In embodiments, within a given level of hierarchy, modules, e.g., 304-312 are connected sparsely, update at a relatively low frequency, and update with a time-delay.

In embodiments, the outputs of a module (e.g., module 310) in a given level of hierarchy are connected only to a subset of inputs of other modules (here, 310 and 308) rather than being connected to all other modules. As a result, sparse connections are created that reduce the required communication bandwidth. In addition, by entirely omitting some connections, sparse connectivity reduces the on-chip memory required by module 304-312 by decreasing the number of weights that the module needs to store. In embodiments, RNN 300 comprises slow updating connections (e.g., 320-322) that may be sampled at a lower frequency than normal RNN connections that update after each timestep.

As will be discussed in more detail with reference to FIG. 6, in certain embodiments, within a given level of hierarchy, the outputs of a module are not communicated to the inputs of other modules on the next timestep. Instead, the outputs are sent at a lower frequency (once every P timesteps) and are delayed by D timesteps before reaching the inputs of the next module. This time-delayed connectivity between modules allows the synchronization operation between modules overlap with the computation of future timesteps.

In embodiments, a single global barrier multiple layers architecture follows the multi-level; however, the RNN is sized such that all of the weights for that module fit into on-chip memory (e.g., registers, L2 cache, and L3 cache). This allows the weights to be loaded only once and then be reused over all timesteps. In embodiments, after each timestep, all of the processor cores exchange output activations and synchronize. The number of modules, amount of connectivity between modules, and frequency of synchronization may be set according to the MBSP parameters of the processor. As a result, the time required by the MBSP-RNN to perform computational, communication, and synchronization operations are approximately balanced. While this architecture places a limit on the maximum number of parameters in a given layer, the limitation is overcome, in embodiments, by stacking multiple layers to form a larger network. Layers may be stacked vertically or horizontally to trade off the depth of the network against the number of parameters.

In embodiments, a sparse time-delayed MBSP-RNN architecture uses a relatively more complete hierarchy to support an arbitrary number of parameters in a single layer. This architecture is similar to the one that was shown in FIG. 3A. In embodiments, the first level (e.g., a lowest level) of hierarchy matches RNN modules directly to processor cores (e.g., threads), and the subsequent levels are matched to other levels of the memory hierarchy (e.g., registers, L2 cache, L3 cache, DRAM, Distributed shared memory, etc.), until all levels of on-chip memory are matched to corresponding memory elements such as to allow all of the network parameters to be stored. In embodiments, memory levels may be expanded to include additional processors (e.g., off-chip processors) that may communicate with each other and/or with different types of memory having differing characteristics (e.g., disc).

In embodiments, a MBSP separated by feed-forward layer RNN architecture comprises two layers. The first layer may comprise a number of parallel modules, such as the module shown in FIG. 2D. Each module may work on a (not necessarily disjoint) subset of the layer input. Modules may communicate with their neighbors according to the MBSP hierarchy for the target processor such that the operation remains work limited. In embodiments, there is no requirement that all of the weights for the first layer fit into on-chip memory, thus, there is no limit on the number of parameters in that layer. However, networks with more parameters may need to perform less frequent communication between modules than networks with less parameters. In embodiments, the second layer is a purely feed-forward layer that processes the outputs of a subset of modules from the first MBSP-RNN layer corresponding to the inverse of a transformation that is performed by the first layer, e.g., to generate an intermediate representation having different size or dimensions, such that processing the inverse leads to the original format of the first layer. Intuitively, the modules in the first layer process a subset of the inputs, and the second layer combines the results of modules that are not strongly connected in the first layer.

It shall be understood, that strategies for grouping and pruning connections between modules as disclosed herein may be applied recursively (e.g., to a division of the RNN that is mapped to one section of a processor, and then, again, to a sub-division of the RNN that is mapped to one sub-section of the processor), while maintaining the basic structure of modules at every layer of the hierarchy.

Figure 3B:
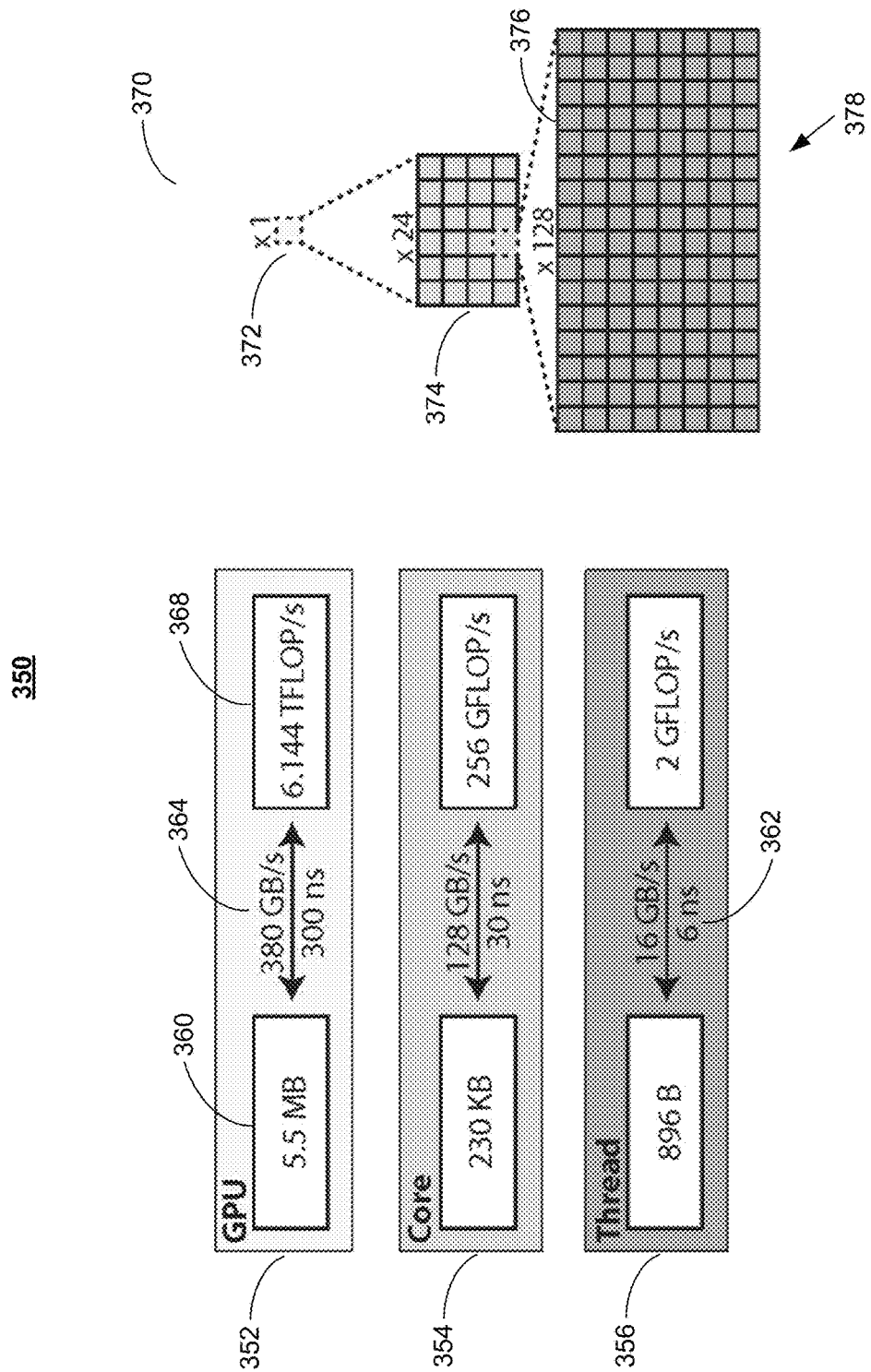
FIG. 3B illustrates the MBSP machine model hierarchy for an exemplary processor, according to various embodiments of the present disclosure.

FIG. 3B illustrates the MBSP machine model hierarchy for an exemplary processor, according to various embodiments of the present disclosure. At mentioned with respect to FIG. 3A, each level of the hierarchy in the MBSP machine model may be described by a list of sets of parameters or attributes representing a target processor, including the number of processor cores, communication bandwidth, synchronization latency, and memory capacity. The details of a particular processor can be obtained from an operations manual or a data sheet for the processor.

In example in FIG. 3B, each level of the hierarchy 352-356 comprises memory capacity 360 that is associated with latency 362 and bandwidth 364, as well as a set of sublevels or compute units 368. Exemplary labels GPU, Core, and Thread in FIG. 3B denote elements that are generated at three different hierarchy levels 352-356 that correspond to three different levels (e.g., level 1-3) in memory hierarchy 370 of processor elements 372-376 for an exemplary processor. In the depicted example, GPU denotes top level 352 that may be viewed as comprising sub-levels Core 354 and lowest sub-level Thread 356. Memory capacity 360 may be expressed in bytes. The processor core computing power is a parameter that may be expressed in floating-point operations per second, as a rate of computation 368 of corresponding computational circuits (e.g., 2 GFLOPS/s per thread), but it is noted that other units or measures are possible. Communication bandwidth 364 is expressed in GB/s, and synchronization latency 362 at which the memory can be accessed within one level (e.g., thread level 356) is expressed in nanoseconds.

In example in FIG. 3B, processor 372 represents a target processor that comprises 24 individual cores 374 that each further comprise 128 individual threads 376. In embodiments, the number of hierarchy levels or sub-levels 352-356 is selected based on the memory levels of the target processor. In embodiments, based on this description of the processor, from lowest level 356 of the hierarchy to highest level 352, rules are applied to each level.

As each neuron requires a certain amount of memory and computation, a parameter representing neurons may be selected, e.g., based on memory capacity 360, to determine the size of each neuron and the number of neurons that fit into a memory 372-376. Communication cost is the cost required to access all neurons in a memory and may be implied from inter-module module connections. In embodiments, the communication cost between neurons is determined from bandwidth and latency. Bandwidth 364 is a measure of the maximum rate at which a particular memory 372-376 can be accessed by computational units. The total amount of memory divided by the bandwidth, i.e., the rate of access, is the total amount of time required to access the memory. In embodiments, this time is equal to the total amount of time required to perform the computation. In embodiments, communication cost is compared to and designed to approximately equal the computational cost. Computational cost may be determined from the rate of computation, normalized by time, by multiplying the number of all neurons by the cost per neuron divided by the rate of computation while normalizing the units (e.g., to seconds).

Based on the MBSP model, one can think of each thread 376 in the grid of threads 378 as layer 356 that comprises some subset of all neurons in an RNN. In embodiments, modules of neurons in thread level 356 are mapped onto thread 376 such that different modules are mapped to different threads 376. When threads 376 in grid 378 operate individually to access any data stored in memory, neurons communicate within thread 376 via intra-module connections, whereas accessing neurons in a different thread in grid 378 constitutes an inter-module connection. In the former case, the value for latency is 6 ns for lowest level 356, whereas in the latter case, when threads 376 cooperate with each other, the value of latency is that of the next higher level (here core level 354) in the hierarchy of processor 372, i.e., 30 ns.

This may be used, together with the bandwidth information (i.e., 16 GB/s for intra-module connections and 128

GB/s for inter-module connections) to determine the time for the communication, taking into account that there is one core 372 for every 128 threads 376, and that bandwidth is shared among the 128 threads 376.

In embodiments, the number of parameters representing neurons is reduced by pruning out, i.e., removing, some of the connections between neurons so as to balance the parameters. In embodiments, the connections between modules are pruned in a manner such that one or more of the constraints discussed with respect to FIG. 3A are met. In embodiments, pruning comprises filling up the memory and examining compliance with each rule and removing connections, if necessary, i.e., if there are too many neurons or connections between neurons. The remaining neurons and connections constitute the final number of a performance-optimized configuration (e.g., in matrix form) for target processor 372.

One skilled in the art will appreciate that the values of processor elements 372-376 are given for an exemplary processor. Similarly, the values for target processor 372 are merely exemplary, such that other processors and processor elements may have different values.

One skilled in the art will further appreciate that matrix computation methods may subsequently be used to enhance performance characteristics such as throughput.

Figure 3C:
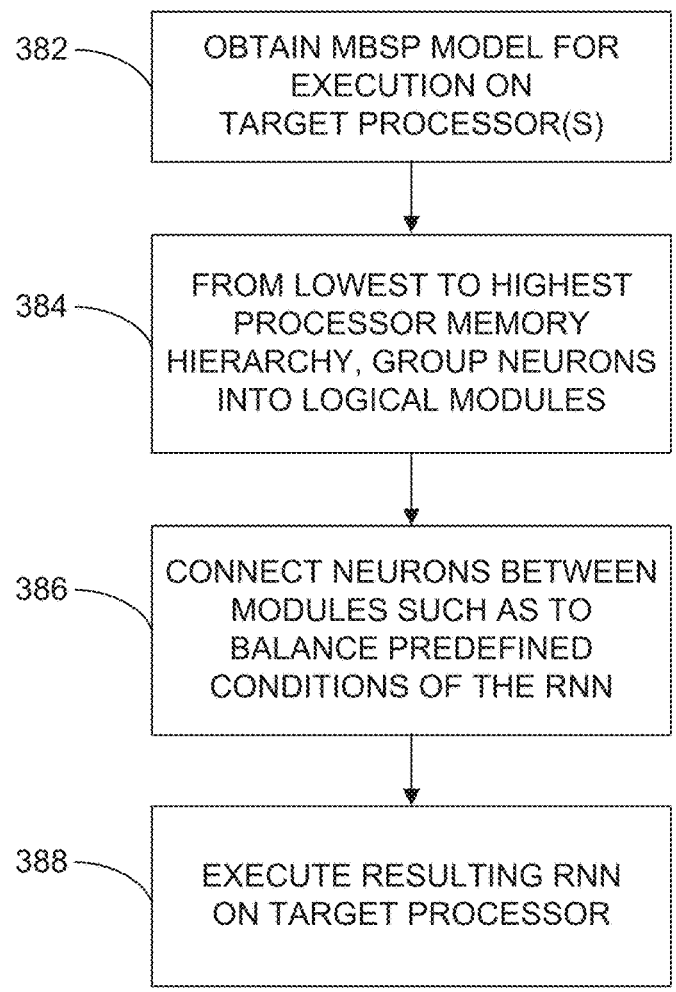
FIG. 3C is a flowchart of a process for creating an efficient RNN layer architecture according to various embodiments of the present disclosure.

FIG. 3C is a flowchart of a process for creating an efficient RNN layer architecture, according to various embodiments of the present disclosure. Process 380 starts at step 382 with a MBSP model designed for execution on one or more target processors. At step 384, in embodiments, from a lowest to a highest processor memory hierarchy, neurons are grouped into logical modules.

At step 386, neurons are connected between modules such as to balance predefined conditions of the RNN. Exemplary conditions are the computational, communication, synchronization, and memory capacity requirements of the RNN. The balancing result is used to prune (i.e., remove) connections between neurons according to various methods discussed with respect to, e.g., FIG. 5-7.

Finally, at step 388, the resulting pruned RNN that comprises the remaining connections that were not pruned out during the balancing process is executed on one or more target processors.

Figure 3D:
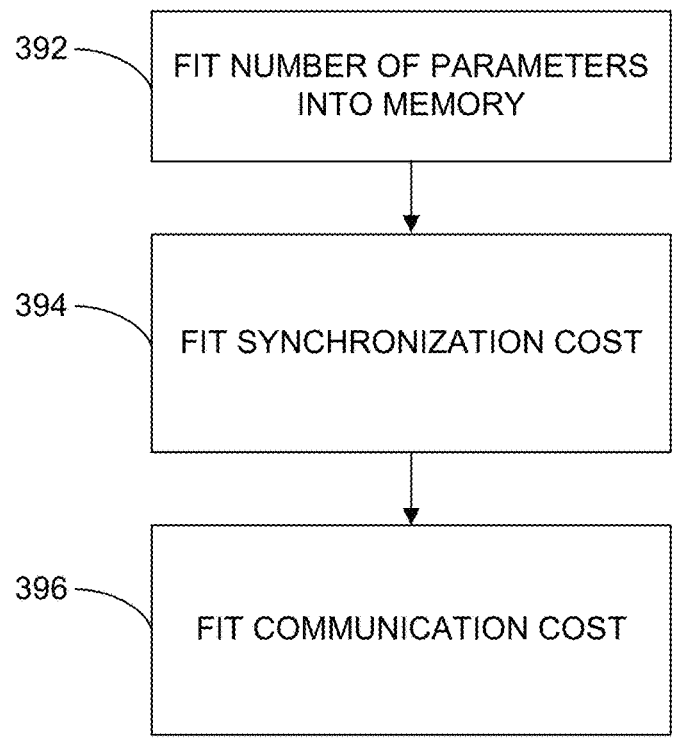
FIG. 3D is a flowchart of a process for balancing predefined conditions of the RNN, according to various embodiments of the present disclosure.

FIG. 3D is a flowchart of a process for balancing predefined conditions of the RNN, according to various embodiments of the present disclosure. At step 392 of process 390, for a given level of memory hierarchy, connections are arranged such that the number of parameters representing neurons selected for a given processor fit into the cache or memory capacity.

At step 394, connections are arranged such that the synchronization cost required to perform inter-module connections is approximately equal to the computational cost of evaluating the neurons.

At step 396, connections are arranged such that the communication cost required to perform inter-module and intra-module connections is approximately equal to the cost of evaluating the neurons, such that latency and bandwidth requirements are reduced.

In embodiments, the number of neurons may be counted and multiplied by the cost per neuron; the result is then compared to a certain limit in the RNN model (e.g., communication cost). If the limit for a parameter is exceeded, the number of neurons is reduced, until the number falls below a threshold limit. In embodiments, this process is repeated for each of the limitations and for each level (e.g., all levels in FIG. 3B) until all conditions are satisfied. For example, the number of neurons may be fit first, then the communication cost, the synchronization cost, and the latency. Any arbitrary order may be chosen without penalty, as subsequent fitting procedures do not increase the number of neurons in the RNN model. One of skill in the art will appreciate that each condition may be defined as a variable for which an equation may be written.

Figure 4:
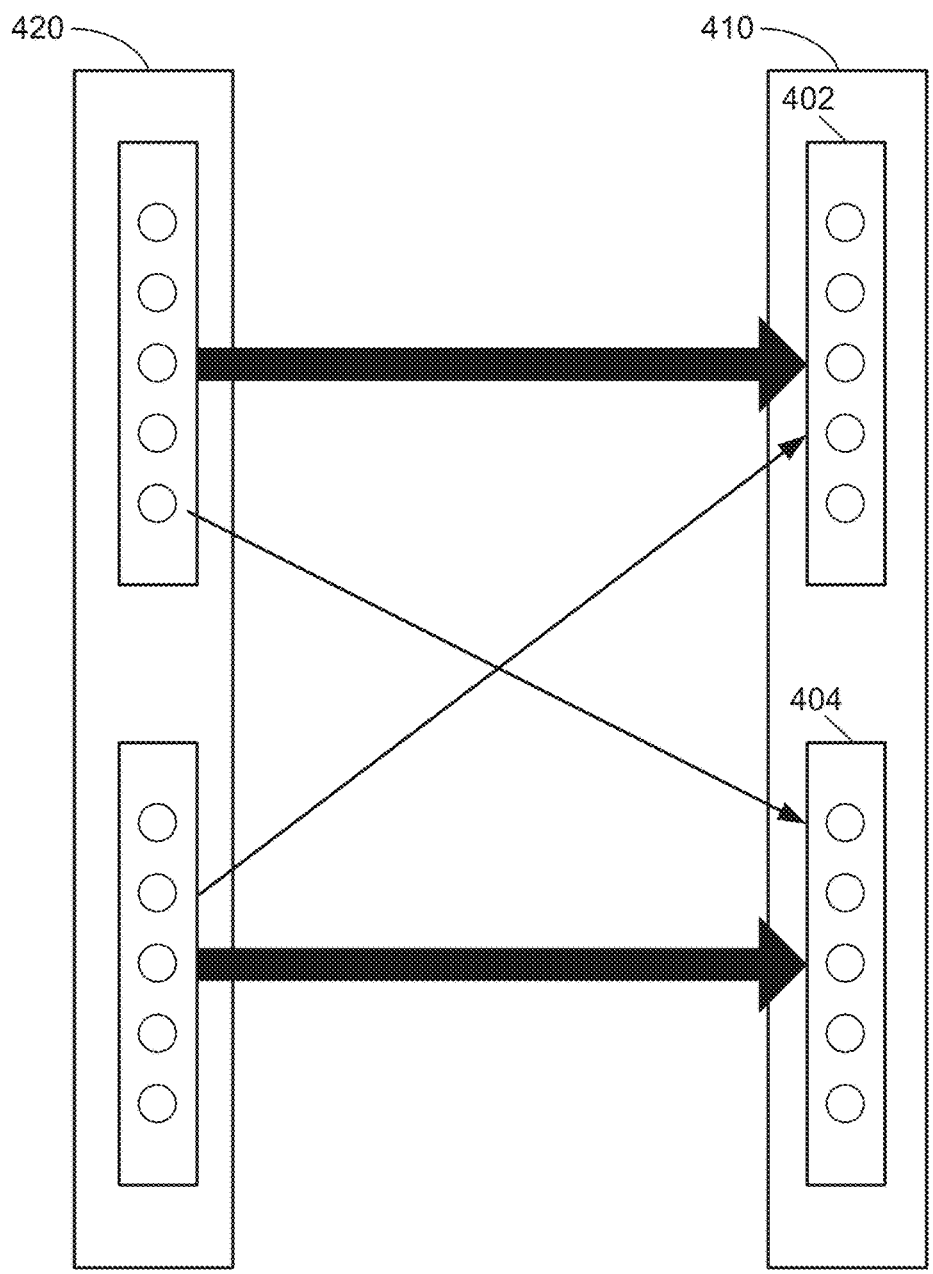
FIG. 4 illustrates the notion of levels of hierarchy of modules in an RNN that is executed on a particular processor, according to various embodiments of the present disclosure.

FIG. 4 illustrates the notion of levels of hierarchy of modules in an RNN that is executed on a particular processor, according to various embodiments of the present disclosure. RNN 400 takes advantage of the fact that chip designers aim at locating one type of physical device comprising electric circuit elements, such as a certain type of memory, in a partition that is located in close proximity to other devices of the same type, thereby, creating a memory hierarchy between individual circuits located on a chip. Nearby circuits within a partition of a processor may be organized into units that perform computational functions, e.g., adders or multipliers, and caches and memory devices.

In embodiments, RNN 400 comprises levels of the hierarchy that are formed according to levels of memory hierarchies of the physical device on which RNN 400 is designed to operate. For example, a first level of hierarchy may be formed by modules 402 and 404 that represent the bottom layer of the hierarchy, where each module comprises a set of neurons. The next higher level, the second level, may be formed by another module 410 that groups together the two modules 402 and 404. This second level of which module 410 may correspond to a second level of hierarchy of the physical device, such as a set of shared memory devices that are accessible by two or more partitions. A third level may correspond to another level in the hierarchy of the physical device, e.g., where all partitions of the processor are connected to one even larger type of memory device. A fourth level may correspond to yet another level in the hierarchy of the physical device, e.g., where the partitions are connected to another set of devices that provides even more memory, and so on. Ideally, the number of levels of hierarchies of connectivity between neurons exactly matches the number of levels of hierarchies in the physical device. However, this is not intended as a limitation. It shall be understood that the levels in a hierarchy are not limited to any particular number.

In embodiments, module 402 communicates with itself over the different timesteps. The amount of internal communication in modules 402 and 404 has a higher bandwidth than the communication that crosses modules 410 and 420, for example, from 402 to 404.

In embodiments, at any given level of the hierarchy, the constraints discussed with reference to FIG. 3A serve as guidelines for 1) choosing a size for a module based on available memory resources of the processor(s); 2) the amount of data communicated between modules based on the capacity of the processor, i.e., based on how much data can be sent at each timestep; and 3) the cost associated with synchronization latency between the different components of the processor, i.e., how long it takes to send a message from one part of the processor to another due to the time gap there has to be between data that is sent from one module to another. By observing the guidelines, hierarchical modules are able to withstand longer delays, such that RNN 400 can operate under stricter latency requirements. In addition, hierarchical modules reduce the amount of communication and increase bandwidth at the other layers.

Figure 5:
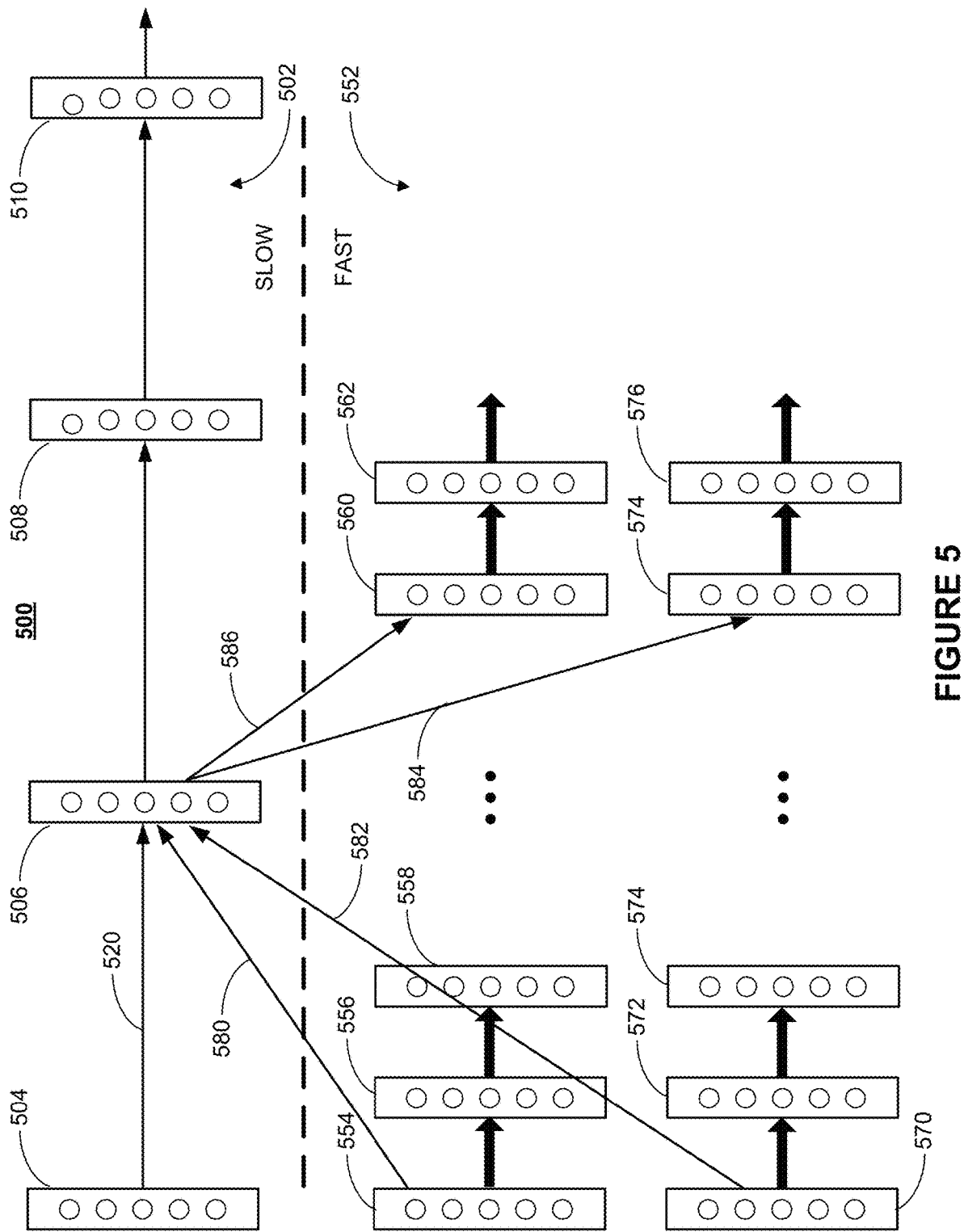
FIG. 5 illustrates an RNN that is segregated into fast and slow modules, according to various embodiments of the present disclosure.

FIG. 5 illustrates an RNN that is segregated into fast and slow modules, according to various embodiments of the present disclosure. In addition to having connections between modules that update at different frequencies, in embodiments, global communication requirements are reduced by explicitly separating modules into fast modules 554-576 and relatively slower modules 504-510. Slow modules 504-510 update at a slower rate than fast modules 502-552 that update at a higher frequency and using more data. In embodiments, as depicted in FIG. 5, these modules are arranged into a first layer 502 comprising fast modules and a second layer 552 that comprises slow modules. In embodiments, two or more fast modules 554-576 operate in parallel and are connected in a manner such that the only way to establish a communication path from a fast module to another fast module is via one of the slow modules 504-510.

In embodiments, fast modules 554-576 are densely connected internally with connections that update frequently, but are then only connected to slow modules 504-510 rather than to fast modules 572-576. Slow modules 504-510 are connected internally and to other fast modules; and all connections update at a slower rate than fast modules 554-576. Intuitively, slow modules 504-510 enable a high level communication between fast modules 554-576 that process mostly independent subsets of the input data.

In embodiments, fast modules 554-576 may communicate only internally, whereas slow modules 504-510 coordinate communication between fast modules 554-576. In embodiments, to establish communication between an exemplary source fast module 554 and an exemplary destination fast module 560, in periodical intervals, first, a communication from fast module 554 to slow module 506 is established. In another step, communication from slow module 506 to destination fast module 560 is established.

Figure 6:
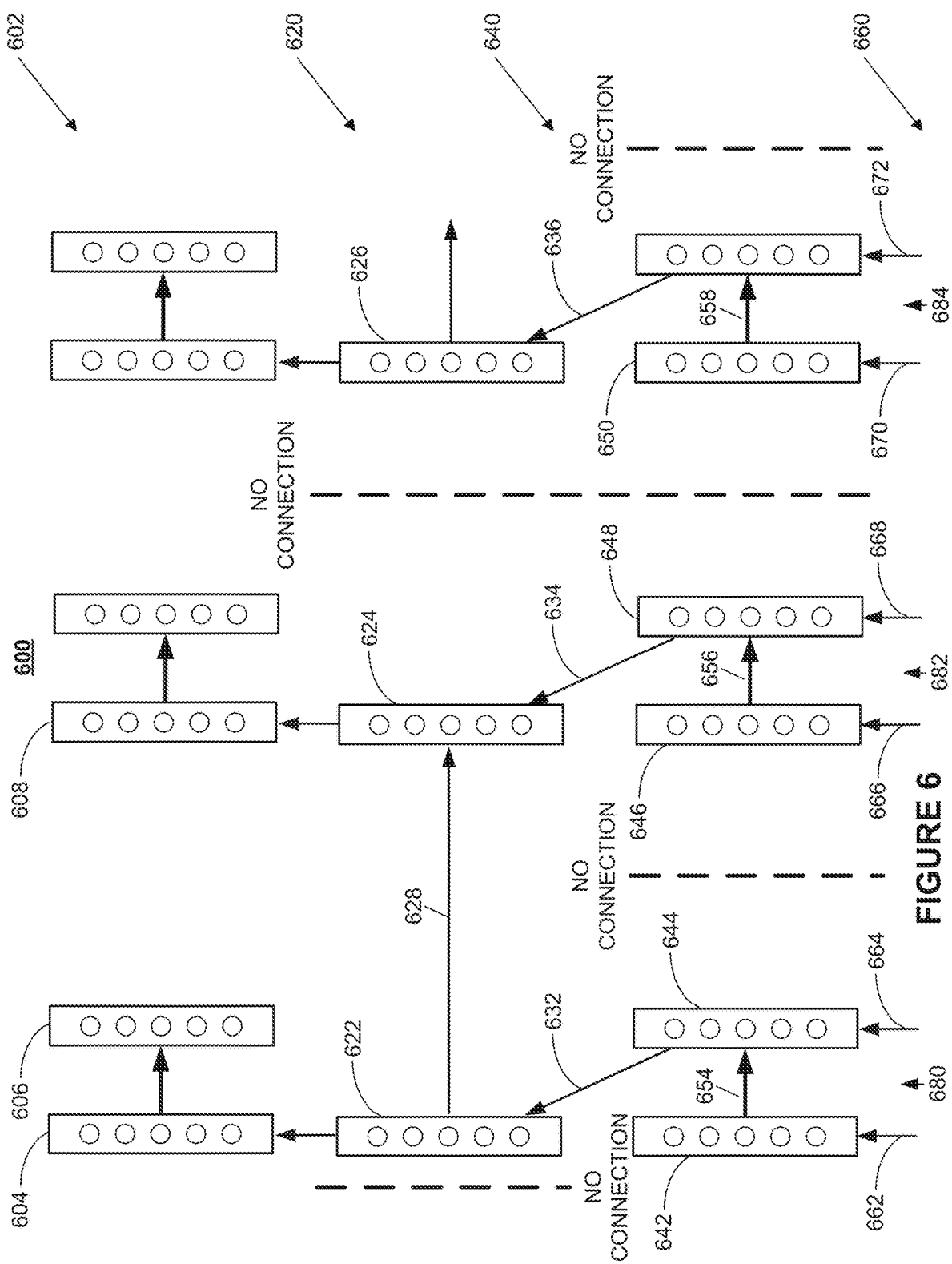
FIG. 6 illustrates a parallel prefix pattern of connectivity according to various embodiments of the present disclosure.

FIG. 6 illustrates a parallel prefix pattern of connectivity according to various embodiments of the present disclosure. Network 600 also comprises two classes of modules: fast and slow. In embodiments, to reduce the communication and synchronization requirements of an RNN, the input sequential data timesteps are broken into independent contiguous subsections, each of which is processed by an RNN to generate intermediate results for each subsection, as shown in FIG. 6. Then another RNN runs over the (smaller) intermediate results, and finally, yet another RNN runs over the input data subsections again, using the processed intermediate results as another input. Conceptually, the time-series information in each subsection may be reduced to a compressed intermediate representation by the first step. Information from each subsection can be combined efficiently by the second step. Finally, the individual subsections may be processed using the combined contextual information from all timesteps. This form is inspired by the form of prefix trees.

In FIG. 6, input time series 660 generating individual time series inputs 662-672 for communication in network 600 is divided into time segments 680-684 rather than breaking the layer into segments. In embodiments, while certain modules in network 600 (e.g., module 642 and module 644) communicate with each other within a time segment (e.g., time segment 680) of input time series 660, other modules in network 600 (e.g., module 644 and module 646) never communicate with each other between time segments (e.g., between time segments 680 and 682), thereby, reducing the frequency and, thus, amount of data communicated between timesteps, thereby, the time spent on communication. Any potential adverse effect on latency is compensated by the fact that more operations are performed in parallel at the same time.

Figure 7:
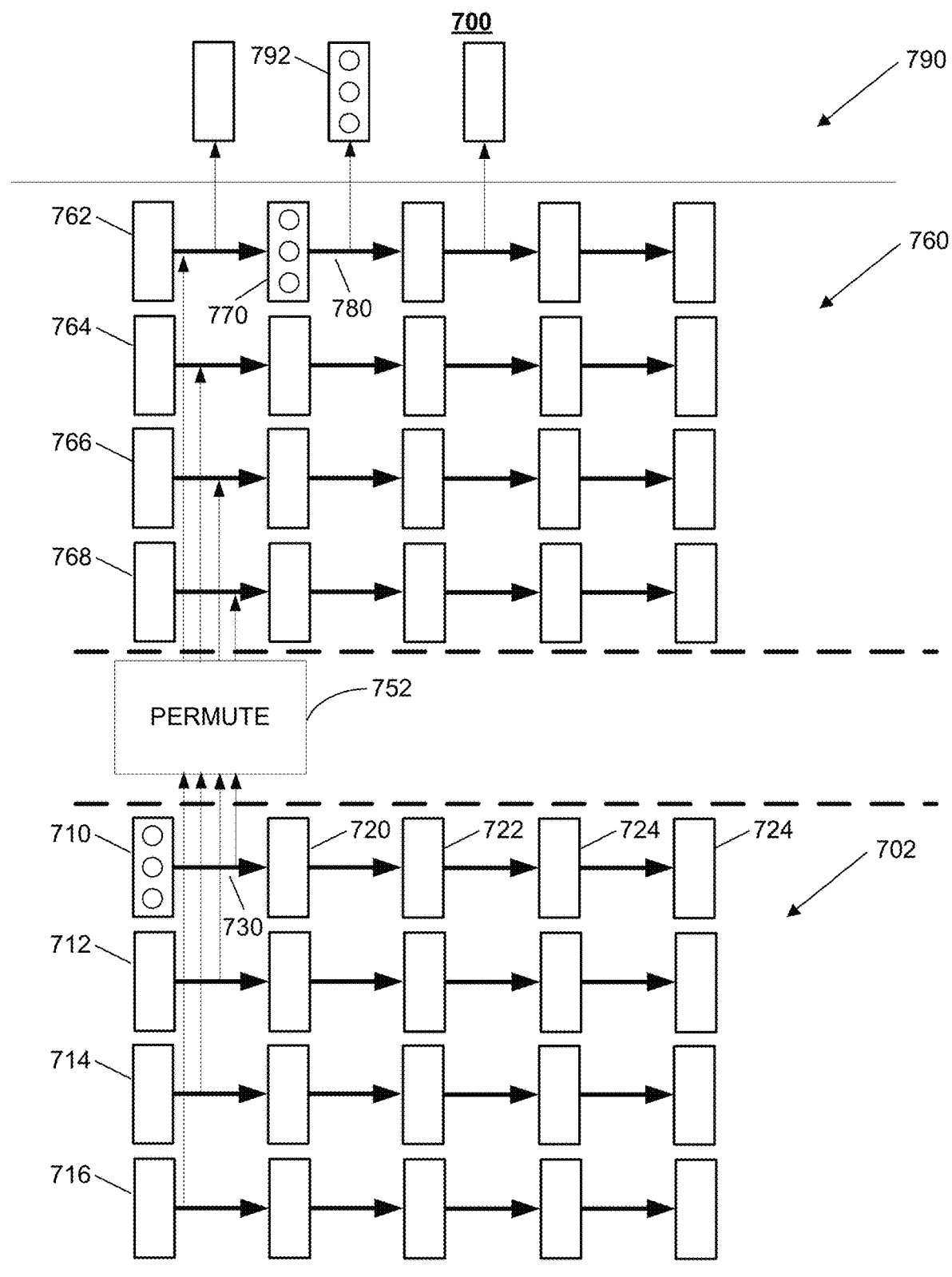
FIG. 7 illustrates another method of enabling global communication while minimizing latency and bandwidth requirements, according to various embodiments of the present disclosure.

FIG. 7 illustrates another method of enabling global communication while minimizing latency and bandwidth requirements, according to various embodiments of the present disclosure. Network 700 comprises sub-modules 710-716 in a first layer 702 and sub-modules and 762-768 in a mirror image second layer 760, permute module 750, input layer (not shown), and output layer 790.

In operation, modules 710-716 in layer 702 and modules 762-768 in layer 760 selectively communicate via permute module 752. In embodiments, modules 710-716 work independently from modules 762-768, and at a relatively faster rate. Each module 710 generates, for example, four outputs in a first timestep in a time series, such that all modules 710-716 in layer 702 generate a total of 16 outputs 730 per timestep. This communication may be performed in a first pass at different localized parts of the processor. After obtaining all outputs 730, in a second pass between timesteps, all of the computed and available outputs 730 of modules 710-716 are shuffled and then copied 1:1 onto the inputs of modules 762-768.

In embodiments, permute module 752 rearranges the order of these 16 outputs by selecting and mixing outputs. For example, the outputs 730 of neurons 0, 1, 2, and 3 in module 710 may be respectively mapped into outputs 780 (e.g., 12, 13, 8, and 9) of module 770, thereby, changing the communication pattern between the modules in the two layers 702 and 760. It shall be understood that permute module 750 may freely select and rearrange any arbitrary number of outputs. In embodiments, the first pass does not involve the entire time series, such that not all outputs 730 need to be obtained first before a mapping to a processor is initiated.

It shall be noted that, in embodiments, other or additional factors may be considered. The following are some additional considerations when designing MBSP-RNNs.

The input activations to an MBSP-RNN layer are evenly partitioned among modules, such that each input is processed by a single module at any level of the hierarchy.

An MBSP-RNN layer should have enough modules to fully subscribe or even oversubscribe the processor cores in the system. This ensures that the layer has enough parallel tasks, such that all of the processor resources can be utilized.

An MBSP-RNN module at any level of the hierarchy should not use so much memory that the weights for the relevant connections cannot be stored in the corresponding level of the processor's memory hierarchy.

Neurons at lower levels of the hierarchy should be more densely connected, and connections should update without delay and at a high frequency. Proceeding up the hierarchy, neurons become more sparsely connected, and connections update with increasing delay and at a lower frequency. The exact number of levels of hierarchy, as well as the connectivity, time delay, and update frequency are determined using the MBSP parameters for the processor that the RNN is being mapped to. In particular, values should be chosen such that the computational cost, the communication cost, and the synchronization cost are approximately equal.

The primary on-chip memory requirement of a RNN are the weight parameters for each connection. In order to balance the computational and communication components of evaluating a network, each weight parameter that is loaded from off-chip memory should be reused multiple times. The three basic strategies for reusing weight parameters include batching over time, batching over samples, and batching over connections.

The ability to send module outputs to other modules only at a lower frequency or with a time-delay allows multiple timesteps to be processed without reloading the weights associated with that module from memory. In particular, timesteps between synchronizations (occurring at a lower frequency than every timestep) may be processed by a given module without reloading weights, even if the RNN includes too many modules at that level of the hierarchy to fit into on-chip memory. One module may be evaluated up to the synchronization point, at which point the processor may switch to another module. The same effect applies to connections that are synchronized after a time-delay. One module may proceed from the current timestep up to the next time-day, at which the processor may switch to another module that it evaluates over the same range of timesteps.

Another strategy for reusing weight parameters is to simultaneously evaluate the same timestep for multiple independent input sequences. This approach is particularly effective for training RNNs, because many optimization algorithms require some level of batching over inputs. However, this strategy is much less effective when using a trained network to perform a task in real time, because the approach presumes the availability of multiple input sequences that, in some instances, may not available. For example, a neural network performing speech recognition on a mobile device would typically support only a single user speaking to it at one time.

Finally, it is possible to reuse the same weight parameters over multiple connections, similar to convolutional neural network layers. In this case, a module may have several inputs from different other modules that all share the same weight. This simultaneously reduces the memory footprint of the module needed to support a given number of connections, and increases the number of times that each weight is used by the module in each timestep.

It will be appreciated to those skilled in the art that the examples and embodiments herein are exemplary and not limiting to the scope of the present invention. It is intended that all permutations, enhancements, equivalents, combinations, and improvements thereto that are apparent to those skilled in the art upon a reading of the current document are included within the true spirit and scope of the present invention.

The invention claimed is:

1. A method to improve a computing performance of a computing device by mapping a Recurrent Neural Network (RNN) architecture to a processor's microarchitecture of the computing device, the method comprising:
    associating each of two or more levels of a hierarchy of an RNN architecture with a level of memory hierarchy in a processor microarchitecture, each level of memory hierarchy being described by at least two of memory capacity, number of processor cores, bandwidth, computational bandwidth, and latency:
        grouping neurons into modules, each module representing a logical unit in an RNN layer within the RNN architecture; and
        arranging connections between the modules such that the modules satisfy conditions of the RNN architecture, the conditions being related to the at least two of memory capacity, number of processor cores, bandwidth, computational bandwidth, and latency.

2. The method according to claim 1, wherein arranging connections comprises pruning bi-directional connections between modules to balance the conditions.

3. The method according to claim 1, wherein for each level of processor memory the conditions comprise that parameters representing neurons fit within a capacity of the processor memory.

4. The method according to claim 1, wherein for each level of processor memory the conditions comprise that a synchronization cost related to inter-module connections is approximately equal to a computational cost of evaluating the neurons.

5. The method according to claim 1, wherein for each level of processor memory the conditions comprise that at least one of a bandwidth cost and a latency cost related to intra-module and inter-module connections approximately equals a computational cost of evaluating the neurons.

6. The method according to claim 1, wherein arranging connections comprises creating sparse connections by connecting outputs of one module to a subset of inputs of other modules on a next timestep to reduce communication bandwidth such that all weights for the module that are loaded on an on-chip memory are reuseable over all timesteps.

7. The method according to claim 1, further comprising updating connections between modules with a time delay that increases a time neurons have to perform synchronization to improve at least one of communication bandwidth and synchronization between modules.

8. The method according to claim 1, further comprising, within a same layer:
    dividing a time series input into independent contiguous time segments that are processed by a first part of the RNN to generate intermediate results for each time segment;
    running a second part of the RNN over the intermediate results; and
    running a third part of the RNN over input data subsections using the processed intermediate results inputs.

9. The method according to claim 1, further comprising:
    connecting individual neurons in a fast module located in a first RNN layer to individual neurons in a slow module located in a second RNN layer;
    connecting each module in its respective layer to other modules in that layer; and
    connecting the fast module to the slow module via an inter-module connection.

10. A non-transitory computer-readable medium or media comprising one or more sequences of instructions which, when executed by at least one processor of a computing device, causes a Recurrent Neural Network (RNN) architecture designed to operate on a processor microarchitecture to improve computing performance of the computing device, the RNN architecture comprising:
    neurons;
    modules comprising the neurons, the modules represent logical units and are arranged according to levels of a hierarchy of a processor microarchitecture to simulate a hierarchical structure of individual computing resources that comprise a processor such that each level of hierarchy is associated with at least one level of processor memory and comprises a first RNN layer and a second RNN layer, each level of processor memory further being associated with at least two of memory capacity, number of processor cores, memory bandwidth, computational bandwidth, and memory latency; and
    bi-directional inter-module connections that enable communication between the first and second RNN layer such as to satisfy conditions of the RNN architecture, the conditions being related to the at least two of memory capacity, number of processor cores, bandwidth, computational bandwidth, and latency.

11. The non-transitory computer-readable medium or media according to claim 10, wherein a frequency of synchronization and an amount of connectivity between modules is set according to Multi-Bulk-Synchronous-Parallel (MBSP) parameters of the processor to balance a time required by the RNN architecture to perform at least one of computational, communication, and synchronization operations.

12. The non-transitory computer-readable medium or media according to claim 11, wherein within a same level of hierarchy, outputs of a module are communicated to inputs of the next module at a lower frequency by updating the inter-module connection at a reduced rate to reduce the amount of data exchange.

13. The non-transitory computer-readable medium or media according to claim 12, wherein a communication of the outputs is delayed by a predetermined number of timesteps such that inter-module connections are applied at the predetermined number of timesteps.

14. The non-transitory computer-readable medium or media according to claim 11, wherein modules in contiguous time segments do not communicate with each other, thereby, reducing the frequency and amount of data communicated between timesteps to reduce communication time and increase the number of parallel operations.

15. The non-transitory computer-readable medium or media according to claim 10, further comprising fast modules having connections that update more frequently than those of slower modules, operate in parallel, and communicate with each other via the slower modules to increase a communication between fast modules.

16. The non-transitory computer-readable medium or media according to claim 15, wherein the fast modules are internally densely connected and process independent subsets of the input data.

17. The non-transitory computer-readable medium or media according to claim 15, wherein the fast and slower modules selectively communicate via a permute module that rearranges the order of computed outputs of the fast modules to map outputs of neurons in a fast module onto outputs of neurons of a slower module to change a communication pattern between the modules in two layers.

18. The non-transitory computer-readable medium or media according to claim 10, wherein an output sequence transformed from an input sequence in one layer is used as the input sequence to another layer thereby stacking layers to expand the RNN architecture to model relatively more complex functions.

19. A method for operating a Recurrent Neural Network (RNN) architecture on a processor's microarchitecture of a computing device to improve a computing performance of the computing device, the method comprising:
based on values associated with levels of memory hierarchy that are based on a description of a processor's microarchitecture, associating each of two or more levels of a hierarchy of an RNN architecture with a level of memory hierarchy that is described by at least two of memory capacity, number of processor cores, bandwidth, computational bandwidth, and latency:
grouping neurons into modules, each module representing a logical unit in an RNN layer within the RNN architecture; and
arranging connections between the modules such that the modules satisfy conditions of the RNN architecture, the conditions being related to the at least two of memory capacity, number of processor cores, bandwidth, computational bandwidth, and latency.

20. The method according to claim 19, wherein arranging connections comprises pruning bi-directional connections between modules to balance the conditions.

* * * * *